United States Patent
Somasundaram et al.

(10) Patent No.: US 8,976,025 B2
(45) Date of Patent: Mar. 10, 2015

(54) HOME MONITORING ENHANCEMENTS

(75) Inventors: Poothabalan Somasundaram, Tirunelveli (IN); Krishnakumar Sundaram, Erode (IN); Ganesh Ramasamy, Chennai (IN); Thamilenthi Palanivelu, Chennai (IN); Arunkumar Surulinathan, Pincode (IN); Pradeep Felix, Chennai (IN); Sundar Sivaraman, Tirunelveli (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 577 days.

(21) Appl. No.: 13/315,789

(22) Filed: Dec. 9, 2011

(65) Prior Publication Data

US 2013/0147623 A1    Jun. 13, 2013

(51) Int. Cl.
| | |
|---|---|
| G08B 21/00 | (2006.01) |
| H04L 12/28 | (2006.01) |
| H04N 5/76 | (2006.01) |
| H04N 5/765 | (2006.01) |
| H04N 5/77 | (2006.01) |
| H04N 21/00 | (2011.01) |
| H04N 21/4223 | (2011.01) |
| H04N 21/4227 | (2011.01) |
| H04N 21/436 | (2011.01) |
| H04N 21/472 | (2011.01) |
| H04N 21/478 | (2011.01) |
| H04N 7/18 | (2006.01) |
| H04N 7/00 | (2011.01) |
| G06F 15/16 | (2006.01) |

(52) U.S. Cl.
CPC ............ *G08B 21/00* (2013.01); *H04L 12/2803* (2013.01); *H04L 12/2825* (2013.01); *H04N 5/76* (2013.01); *H04N 5/765* (2013.01); *H04N 5/772* (2013.01); *H04N 7/00* (2013.01); *H04N 21/00* (2013.01); *H04N 21/4223* (2013.01); *H04N 21/4227* (2013.01); *H04N 21/43615* (2013.01); *H04N 21/43622* (2013.01); *H04N 21/47217* (2013.01); *H04N 21/478* (2013.01)
USPC ............ 340/540; 348/143; 348/152; 348/65; 725/141

(58) Field of Classification Search
CPC .................. G08B 13/19684; G08B 13/19691; H04N 2005/441; H04N 21/2187; H04N 21/472; H04N 21/47202; H04N 5/4403; H04N 7/17318; H04N 7/181; H04N 7/186; G05D 23/1917
USPC ......... 340/540, 541, 506, 286.2; 348/152, 65, 348/143
See application file for complete search history.

(56) References Cited

U.S. PATENT DOCUMENTS

| | | | | |
|---|---|---|---|---|
| 8,619,136 | B2 * | 12/2013 | Howarter et al. | 348/143 |
| 8,675,071 | B1 * | 3/2014 | Slavin et al. | 348/156 |
| 8,687,626 | B2 * | 4/2014 | Hawkins | 370/353 |

(Continued)

*Primary Examiner* — Brian Zimmerman
*Assistant Examiner* — Bhavin M Patel

(57) ABSTRACT

A system may include a set-top box configured to receive a television signal and provide the television signal to a media playing device, and a home monitoring device configured to obtain a video recording using a security camera, provide the video recording to a media manager device across a network, and provide information about the video recording to the set-top box. The set-top box may be further configured to provide the information about the video recording upon activation of the set-top box by a customer, receive a request to view the video recording from the customer, retrieve the video recording from the media manager device, and provide the video recording to a media playing device.

18 Claims, 11 Drawing Sheets

(56) References Cited

U.S. PATENT DOCUMENTS

| | | | |
|---|---|---|---|
| 2004/0215694 A1* | 10/2004 | Podolsky | 709/201 |
| 2007/0288975 A1* | 12/2007 | Cashman et al. | 725/110 |
| 2011/0030016 A1* | 2/2011 | Pino et al. | 725/80 |
| 2011/0258557 A1* | 10/2011 | Karaoguz et al. | 715/751 |

\* cited by examiner

HOME MONITORING ENHANCEMENTS

BACKGROUND INFORMATION

A user may install a home monitoring system that includes one or more security video cameras. The video cameras may be used to monitor the user's home. For example, a security video camera may detect motion and make a video recording of an area in response to the detected motion. The user may be able to play back recorded videos by accessing the security video camera at the user's home. However, the user may find accessing the security video camera inconvenient.

DETAILED DESCRIPTION OF PREFERRED EMBODIMENTS

Figure 1:
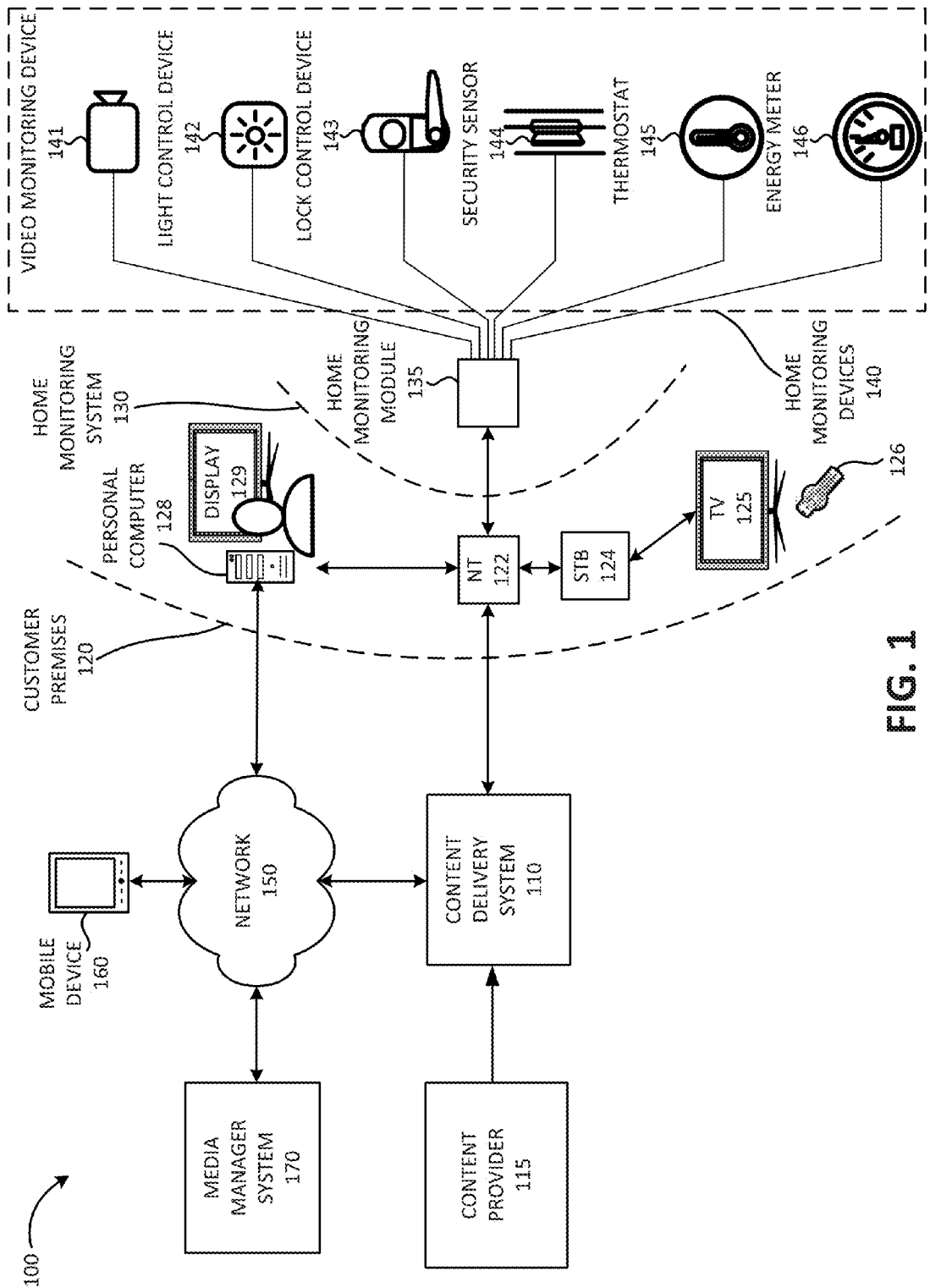
FIG. 1 is a diagram illustrating an exemplary environment according to an implementation described herein.

The following detailed description refers to the accompanying drawings. The same reference numbers in different drawings identify the same or similar elements.

An implementation described herein may relate to enhancements for a home monitoring system. A home monitoring system may be installed on customer premises and may enable a customer to monitor and/or control various aspects of the user's home. The home monitoring system may include one or more home monitoring devices, such as video cameras, light control devices, lock control devices, security sensors, a thermostat, and/or an energy meter. The home monitoring system may be integrated with a system for providing television services to the customer.

For example, an implementation described herein may include a home monitoring system integrated with a set-top box that receives television content and outputs the television content to a television. The customer may use the set-top box to configure a security video camera via a home monitoring module that controls the home monitoring system. For example, the customer may use the set-top box to select one or more trigger conditions to initiate a video recording, may select a duration of a video recording, may select one or more criteria for sending an alert about a video recording, may select one or more devices for receiving an alert about a video recording, may select one or more ranking criteria for ranking video recordings, and may select one or more criteria for annotating a video recording.

Furthermore, an implementation described herein may include providing video recordings made by a security video camera to a customer via a set-top box. For example, the home monitoring module may generate a video recording and may provide the video recording to a media manager server device across a network. The media manager server device may store and/or manage media files associated with the customer, such as photographs, videos, audio files. Furthermore, the home monitoring module may provide information about the generated video recording to the set-top box. When the customer activates the set-top box (e.g., to watch television), the set-top box may provide information about the generated video recording. If the customer selects to play the video recording, the set-top box may retrieve the video recording from the media manager server device and play the video recording.

Furthermore, an implementation described herein may include sending an alert about a video recording to a device associated with the customer, in response to generating a video recording. For example, when the home monitoring module generates a video recording using a security video camera, the home monitoring module may send an alert to a mobile device associated with the customer. The customer may use the mobile device to retrieve the generated video recording from the media manager server device and play the video recording on the mobile device. Additionally or alternatively, the customer may select to receive alerts to a particular account (e.g., an email account).

Moreover, an implementation described herein may include configuring a home monitoring system, associated with a first customer, to authorize a second customer to access the home monitoring system. For example, the first customer may be going on a vacation and may authorize the second customer to manage the home monitoring system while the first customer is on vacation. The authorization may include restrictions selected by the first customer. For example, the first customer may authorize the second customer to receive alerts about video recordings made by a security video camera and/or to play generated video recording on the second customer's set-top box, but may not allow the second customer to control door locks or to adjust a thermostat.

FIG. 1 is a diagram of an exemplary environment 100 in which the systems and/or methods described herein may be implemented. As shown in FIG. 1, environment 100 may include a content delivery system 110, a content provider 115, customer premises 120, a network 150, a mobile device 160, and a media manager system 170. While FIG. 1 depicts a single content delivery system 110, a single content provider 115, a single customer premises 120, a single network 150, and a single mobile device 160 for illustrative purposes, in practice, environment 100 may include multiple content delivery systems 110, multiple content providers 115, multiple customer premises 120, multiple networks 150, and/or multiple mobile devices 160.

Content delivery system 110 may include one or more devices, such as server devices, that ingest content, store content, format content, and/or deliver content to customer premises 120 and/or mobile device 160. For example, content delivery system 110 may provide television channels, including content received from content provider 115. While content delivery system 110 is illustrated in FIG. 1 as connecting to a single customer premises 120 for explanatory purposes, in practice, content delivery system 110 may connect to multiple customer premises 120 (and/or to multiple mobile devices 160).

Content provider 115 may include one or more devices, such as server devices, that provide content to content delivery system 110. For example, content provider 115 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 115 may also include on-demand content providers (e.g., video on demand (VOD), pay per view (PPV), etc.).

Customer premises 120 may include a particular location (or multiple locations) associated with a customer. For example, customer premises 120 may include the customer's home. Devices associated with customer premises 120, as well as mobile device 160, may receive content, such as video content, via content delivery system 110. Devices associated with customer premises 120, as well as mobile device 160, may be considered "user devices," "customer devices," and/or "network devices." Customer premises 120 may include a network terminal (NT) 122, a set top box (STB) 124, a television 125, a remote control 126, a personal computer 128, a display 129, and a home monitoring system 130.

NT 122 may receive content from content delivery system 110 via a connection, such as, for example, via a fiber optic cable connection, a coaxial cable connection, a wireless connection, and/or another type of connection. Furthermore, NT 122 may send information from a device associated with customer premises 120 to content delivery system 110. In one implementation, NT 122 may include an optical network terminal and NT 122 and content delivery system 110 may form part of a high-speed fiber optic network. In another implementation, NT 122 may include a cable modem. In yet another implementation, NT 122 may include a fixed wireless transceiver, a WiFi access point, and/or a Bluetooth device. Additionally or alternatively, NT 122 may include a layer 2 and/or layer 3 network device, such as a switch, router, firewall, and/or gateway. Customer premises 120 may receive one or more services via the connection between NT 122 and content delivery system 110, such as, for example, a television service, Internet service, and/or voice communication (e.g., telephone) service.

STB 124 may receive content and output the content to television 125 for display. STB 124 may include a component (e.g., a cable card or a software application) that interfaces with (e.g., plugs into) a host device (e.g., personal computer 128, television 125, a stereo system, etc.) and allows the host device to display content. STB 124 may also be implemented as a home theater personal computer (HTPC), an optical disk player (e.g., digital video disk (DVD) or Blu-Ray™ disc player), a cable card, etc. STB 124 may receive commands and/or other types of data from other devices, such as remote control 126, and may transmit the data to other devices in environment 100, such as, for example, media manager system 170.

Television 125 may output content received from STB 124. Television 125 may include speakers as well as a display. Remote control 126 may issue wired or wireless commands for controlling other electronic devices, such as television 125 and/or STB 124. Remote control 126, in conjunction with STB 124, may allow a customer to interact with an application running on STB 124, such as an application to provide information about video recordings made by a home monitoring security camera. Other types of devices (e.g., a keyboard, mouse, mobile phone, etc.) may be used instead of, or in addition to, remote control 126, in order to control television 125 and/or STB 124.

Personal computer 128 may include a desktop computer, a laptop computer, a tablet computer, a mobile communication device, a personal digital assistant (PDA), or another type of computation and/or communication device. Personal computer 128 may include a microphone to capture audio, a camera to capture images or video. Personal computer 128 may include display 129 for displaying images and/or video content received from content delivery system 110. Personal computer 128 may also include a speaker for playing audio signals.

Home monitoring system 130 may include one or more devices that enable a customer to monitor and/or control various aspects of customer premises 120. Home monitoring system 130 may include a home monitoring module 135 and one or more home monitoring devices 140 (referred to herein collectively as "home monitoring devices 140" and individually as "home monitoring device 140"). For example, home monitoring devices 140 may include a video monitoring device 141, a light control device 142, a lock control device 143, a security sensor 144, a thermostat 145, and/or an energy meter 146.

Home monitoring module 135 may control and/or manage home monitoring devices 140 and may interface with other devices in environment 100, such as NT 122, STB 124, and/or media manager system 170. For example, home monitoring module 135 may control video monitoring device 141 to generate a video recording, may provide the video recording to media manager system 170, and may provide information about the video recording to STB 124. Home monitoring module 135 may also send an alert about a video recording to a device associated with customer premises 120, such as mobile device 160. Furthermore, home monitoring module 135 may also authorize another user to access home monitoring system 130.

Video monitoring device 141 may correspond to a security camera. Video monitoring device 141 may include a motion detector that detects motion within a field of view of the video monitoring device 141. Video monitoring device 141 may generate a video recording in response to detecting motion within the field of view and may provide the generated video recording to home monitoring module 135. While a single video monitoring device 141 is illustrated in FIG. 1, in practice, home monitoring system 130 may include multiple video monitoring devices 141.

Light control device 142 may include a device for turning on a light, turning off a light, or dimming a light associated with customer premises 120. Lock control device 143 may control a lock (e.g., window lock, door lock, etc.) associated with customer premises 120. Security sensor 144 may include a sensor that may inform home monitoring module 135 of a change in a particular parameter associated with customer premises 120. For example, security sensor 144 may include a door or window sensor, a motion sensor, a heat sensor, a pressure sensor, and/or any other type of security sensor. Thermostat 145 may control a heater and/or an air conditioning unit associated with customer premises 120. For example, thermostat 145 may maintain customer premises 120 at a set temperature. Energy meter 146 may include one or more sensor to monitor energy usage associated with customer premises 120.

Network 150 may include one or more wired and/or wireless networks. For example, network 150 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof, and/or another type of wireless network. Additionally, or alternatively, network 150 may include a local area network (LAN), a wide area network (WAN), a metropolitan area network (MAN), an ad hoc network, an intranet, a fiber optic-based network (e.g., a fiber optic service (FiOS) network), a television network, and/or a combination of these or other types of networks. Network 150 may enable content delivery system 110 to communicate with mobile device 160 and/or with media manager system 170.

Mobile device 160 may include a mobile communication device, such as a mobile phone, a smart phone, a tablet computer, a laptop, a PDA, or another type of portable communication device. Mobile device 160 may receive alerts from home monitoring system 130 via network 150. In one embodiment, mobile device 160 may be associated with a customer account associated with customer premises 120. In another embodiment, mobile device 160 need not be associated with customer premises 120.

Media manager system 170 may include one or more devices, such as server devices, that manage media content for a customer associated with customer premises 170. For example, a customer may use STB 124, personal computer 128, and/or mobile device 160 to upload media content to media manager system 170, download content from media manager system 170, and/or stream media content from media manager system 170. The media content may include, for example, photographs, video recordings, and/or audio recordings created by the customer. As another example, the media content may include content purchased by the customer, such as, for example, music songs, movies, electronic books, and/or other media content. Furthermore, media manager system 170 may receive video recordings made by video monitoring device 141 via home monitoring module 135 and may store the received video recordings in associated with the customer. Media manager system 170 may provide a stored video recording to another device, such as STB 124, personal computer 128, and/or mobile device 160 upon receiving a request to access the video recording.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
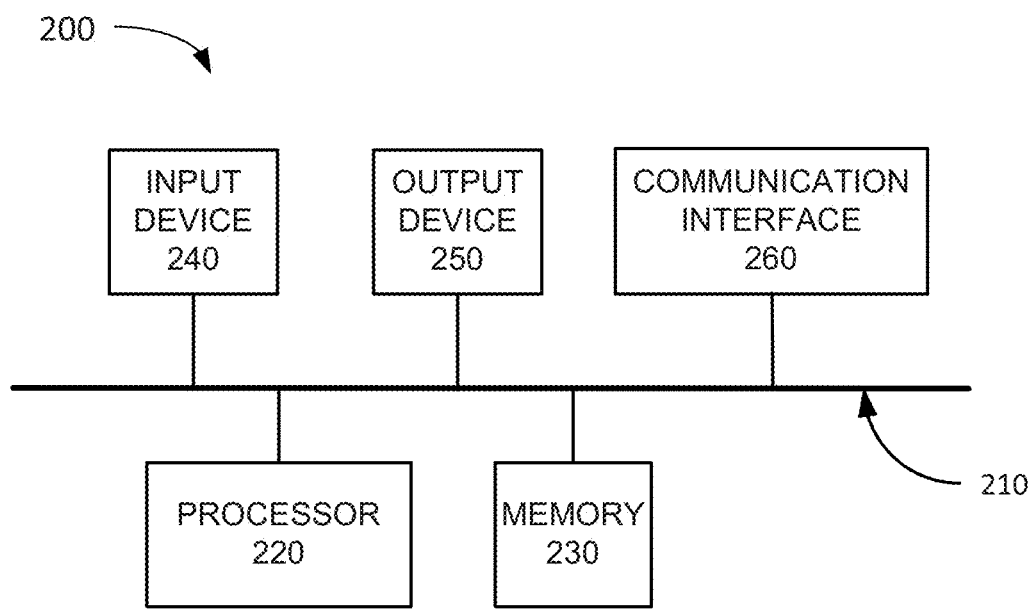
FIG. 2 is a diagram illustrating exemplary components of a device of FIG. 1.

FIG. 2 is a diagram illustrating exemplary components of a device 200 according to an implementation described herein. Home monitoring module 135, STB 144, personal computer 148, and/or mobile device 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to operation of home monitoring system 130 and/or management of content associated with home monitoring system 130. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
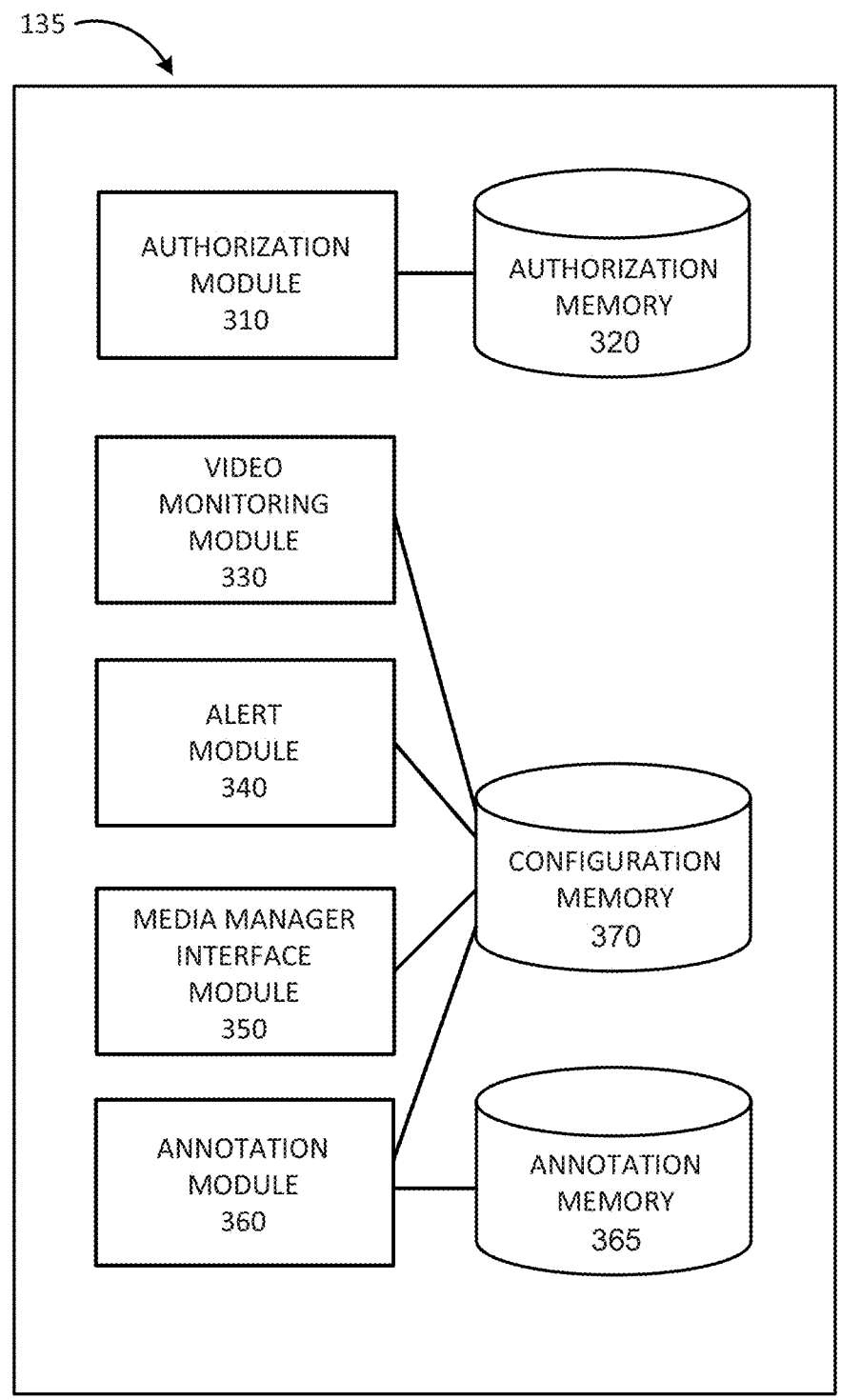
FIG. 3 is a diagram illustrating exemplary functional components of the home monitoring module of FIG. 1.

FIG. 3 is a diagram illustrating exemplary functional components of home monitoring module 135. The function components of home monitoring module 135 may be implemented, for example, via processor 220 executing instructions from memory 230. As shown in FIG. 3, home monitoring module 135 may include an authorization module 310, an authorization memory 320, a video monitoring module 330, an alert module 340, media manager interface module 350, an annotation module 360, an annotation memory 365, and a configuration memory 370.

Authorization module 310 may authorize a user to manage home monitoring system 130 and/or to receive content associated with home monitoring system 130. For example, authorization module may enable a customer to log in to home monitoring system 130 from a remote location using a username and password. Furthermore, home monitoring system 130 may enable a customer to authorize another user to manage home monitoring system 130 and/or to receive content associated with home monitoring system 130. Authorization module 310 may apply restrictions to the other user based on restrictions selected by the customer. For example, the other user may be authorized to receive video recordings generated by video monitoring device 141 and may not be authorized to control other home monitoring devices 140. Authorization memory 320 may store authorizations associated with home monitoring system 130. For example, authorization memory 320 may store authorization information associated with a user (e.g., username, password, set-top box identifier, mobile device identifier, etc.).

Video monitoring module 330 may control video monitoring device 141. In one implementation, video monitoring module 330 may configure video monitoring device 141 based on one or more configuration selections made by the customer, such as, for example, one or more trigger events to initiate a video recording and/or a duration for a video recording. In another implementation, video monitoring module 330 may directly control video monitoring device 141. Video monitoring module 330 may also receive a video recording generated by video monitoring device 141 and may provide information about the video recording to another module.

Alert module 340 may determine whether to send an alert about a generated video recording in response to the video recording being generated. For example, alert module 340 may receive information about a generated video recording from video monitoring module 330 and may decide whether to send an alert based on one or more criteria. If alert module 340 determines to send an alert, alert module 340 may determine one or more devices to send an alert to and may send the alert to the determined one or more devices.

Media manager interface module 350 may provide a video recording to media manager system 170. Media manager interface module 350 may convert the video recording into a particular format compatible with media manager system 170 prior to sending the video recording to media manager system 170.

Annotation module 360 may annotate a generated video recording based on one or more annotation criteria. For example, annotation module 360 may annotate the video recording with information about a time at which the video recording was made, information about a particular video recording device 141 that made the video recording, and/or information about what event triggered the video recording to be made.

Furthermore, annotation module 360 may annotate the video recording based on analyzing the video recording. Annotation memory 365 may store information that may be used by annotation module 360 to analyze information associated with a video recording and determine that the video recording corresponds to an expected event. As an example, annotation module 360 may determine that a video recording from a front door camera is generated each weekday between the hours of 2:30 PM and 4:00 PM. Annotation memory 365 may include information indicating that a video recording from a front door camera that is generated each weekday between the hours of 2:30 PM and 4:00 PM may correspond to a mailman delivering mail. Annotation module 360 may annotate the video recording with a label indicating that the video recording probably corresponds to a mailman delivering the mail.

As another example, annotation module 360 may interface with a calendar associated with the customer associated with customer premises 120 (e.g., a calendar stored on mobile device 160). For example, the calendar may include information about a location associated with a scheduled event. If the location corresponds to customer premises 120, and if a video recording is generated within a particular time period of the scheduled event, annotation module 360 may annotate the video recording based on information associated with the scheduled event. For example, if the calendar included a scheduled event "lawn mowing" at 1:00 PM on a particular date, and a video recording is generated at 1:15 PM on the particular date by video recording device 141, annotation module 360 may annotate the video information with information about the scheduled event.

Configuration memory 370 may store one or more configurations associated with home monitoring module 135. Exemplary components of configuration memory 370 are described below with reference to FIG. 4.

Although FIG. 3 shows exemplary functional components of home monitoring module 135, in other implementations, home monitoring module 135 may include fewer functional components, different functional components, differently arranged functional components, or additional functional components than depicted in FIG. 3. Additionally or alternatively, one or more functional components of home monitoring module 135 may perform functions described as being performed by one or more other functional components of home monitoring module 135.

Figure 4:
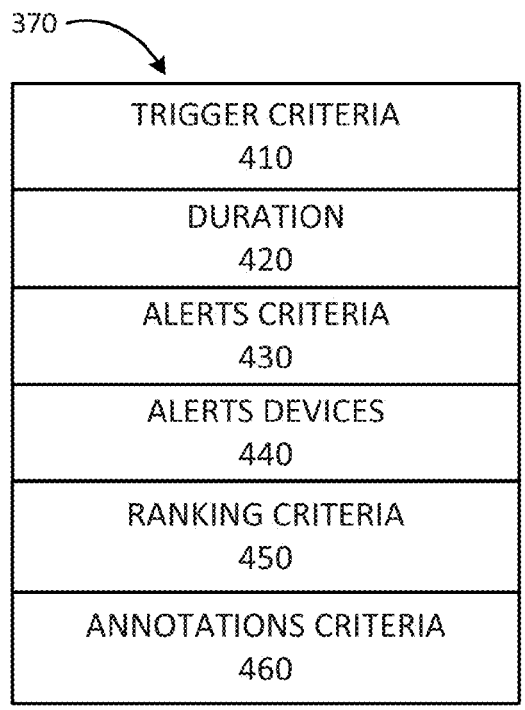
FIG. 4 is a diagram illustrating exemplary components of the configuration memory of FIG. 3.

FIG. 4 is a diagram illustrating exemplary components of configuration memory 370. As shown in FIG. 4, configuration memory 370 may include a trigger criteria field 410, a duration field 420, an alerts criteria field 430, an alerts devices field 440, a ranking criteria field 450, and an annotations criteria field 460.

Trigger criteria field 410 may include information about one or more triggers that may trigger a video recording to be made by video recording device 141. For example, a trigger may correspond to detected motion. As another example, a trigger may correspond to a particular level of detected motion. As yet another example, a trigger may correspond to a particular time. For example, the customer may select to record a one minute video each hour. As another example, a trigger may correspond to a time corresponding to a scheduled event associated with a calendar associated with the customer (e.g., a calendar stored on mobile device 160). As yet another example, a trigger may correspond to activation of security sensor 144.

Duration field 420 may store information about a duration of a video recording selected by a customer. For example, the customer may select that when a video recording is triggered, video monitoring device 141 is to record for one minute.

Alerts criteria field 430 may include information about one or more criteria for sending an alert in response to a video recording being generated by video monitoring device 141. For example, the customer may select to send an alert for every generated video recording. As another example, a customer may select to send an alert for a particular type of trigger. As yet another example, a customer may select to send an alert if the video recording was made within a particular time period (e.g., during night hours).

Alerts devices field 440 may include information about one or more devices, or one or more accounts, that are to receive alerts about generated video recordings. For example, a customer may select to receive alerts to mobile device 160. As another example, a customer may select a particular account (e.g., email account) that is to receive the alerts.

Ranking criteria field 450 may include information about one or more ranking criteria for ranking video recordings. Information about video recordings may be presented to the customer by STB 124 based on the ranking criteria. In one example, the ranking criteria may specify that video recordings are to be presented in chronological order. In another example, the ranking criteria may specify that video recordings made during a particular time of day are to be given preferential ranking. In yet another example, the ranking criteria may specify that video recordings made with a particular video monitoring device 141 (e.g., a back door camera) are to be given preferential ranking.

Annotations criteria field 460 may include information about the type of annotations that are to be added to a video recording. For example, the annotations may include a time at which the video recording was made, a particular video monitoring device 141 that made the recording, a type of trigger that triggered video monitoring device 141 to make the video recording, a possible explanation for the video recording based on information stored in annotation memory 365, and/or annotations based on information obtained from a calendar associated with the customer.

Although FIG. 4 shows exemplary components of configuration memory 370, in other implementations, configuration memory 370 may include fewer components, different components, differently arranged components, or additional components than depicted in FIG. 4.

Figure 5:
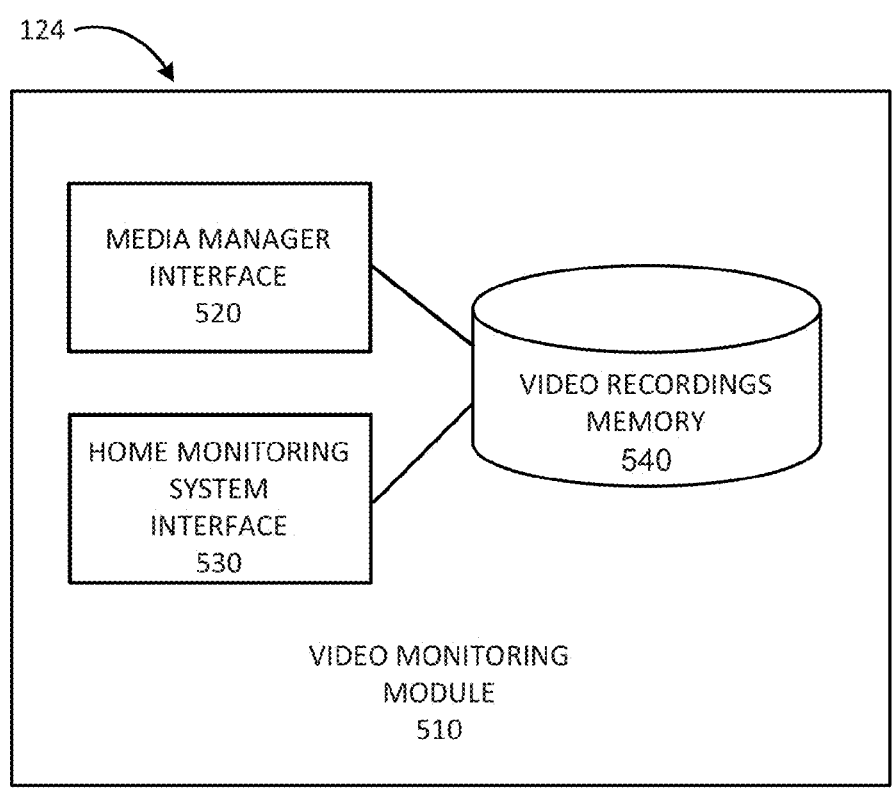
FIG. 5 is a diagram illustrating exemplary components of a set-top box according to an implementation described herein.

FIG. 5 is a diagram illustrating exemplary components of STB 124 according to an implementation described herein. The function components of STB 124 may be implemented, for example, via processor 220 executing instructions from memory 230. As shown in FIG. 5, STB 124 may include a video monitoring module 510.

Video monitoring module 510 may include an application that runs on STB 124. For example, video monitoring module 510 may be installed on STB 124 by video monitoring module 135 when video monitoring module 135 is installed in customer premises 120 and put in communication with STB 124. Video monitoring module 510 may include a media manager interface 520, a home monitoring system interface 530, and a video recordings memory 540.

Media manager interface 520 may obtain a video recording from media manager system 170. For example, a customer may be provided with information about new video recordings and may user remote control 126 to select one of the new video recordings. In response to the selection, media manager interface 520 may obtain the video recording from media manager system 170 and play the video recording on television 125. In one example, the video recording may be obtained (e.g., downloaded) from media manager system 170. In another example, the video recording may be streamed from media manager system 170.

Home monitoring system interface 530 may receive information about generated video recordings from home monitoring module 135 and store the received information in video recordings memory 540. The information may include, for example, one or more thumbnails of still images from a video recording and/or information generated by annotation module 360. When STB 124 is activated, video monitoring module 510 may access video recordings memory 540 to determine whether any new video recordings have been generated. If new video recordings have been generated, video monitoring module 510 may provide information about the new video recordings to the customer.

Although FIG. 5 shows exemplary functional components of STB 124, in other implementations, STB 124 may include fewer functional components, different functional components, differently arranged functional components, or additional functional components than depicted in FIG. 5. Additionally or alternatively, one or more functional components of STB 124 may perform functions described as being performed by one or more other functional components of STB 124.

Figure 6:
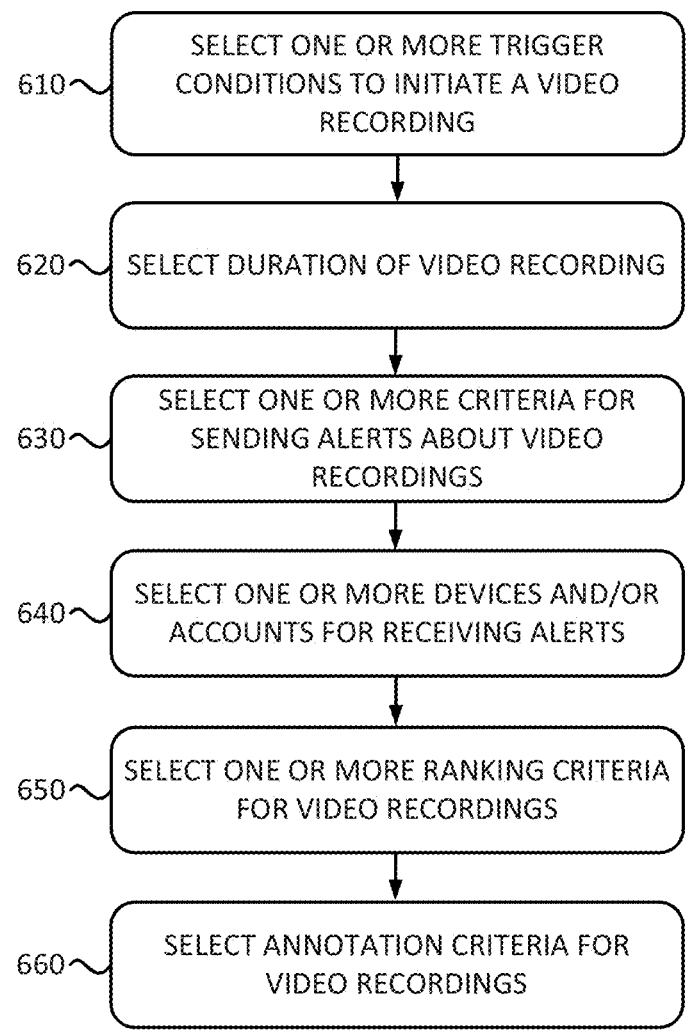
FIG. 6 is a flow chart of an exemplary process for configuring a video monitoring module according to an implementation described herein.

FIG. 6 is a flow chart of an exemplary process for configuring a video monitoring module according to an implementation described herein. In one implementation, the process of FIG. 6 may be performed by home monitoring module 135. In other implementations, some or all of the process of FIG. 6 may be performed by another device or a group of devices separate from home monitoring module 135 and/or including home monitoring module 135. For example, in another implementation, some or all of the process of FIG. 6 may be performed by STB 124.

The process of FIG. 6 may include selecting one or more trigger conditions to initiate a video recording (block 610). For example, the customer may use remote control 126 to select one or more trigger condition options provided by video monitoring module 510, video monitoring module 510 may provide the selections to home monitoring module 135, and home monitoring module 135 may store the selections in configuration memory 370. For example, the customer may select one or more of a detected motion as a trigger event, a particular level of detected motion as a trigger event, a particular time as a trigger event, a particular scheduled event associated with a calendar as a trigger event, and/or may select another type of trigger event.

A duration of a video recording may be selected (block 620). For example, the customer may use remote control 126 to select a duration option provided by video monitoring module 510, video monitoring module 510 may provide the selection to home monitoring module 135, and home monitoring module 135 may store the selections in configuration memory 370.

One or more criteria for sending alerts about video recordings may be selected (block 630). For example, the customer may use remote control 126 to select one or more alert criteria options provided by video monitoring module 510, video monitoring module 510 may provide the selections to home monitoring module 135, and home monitoring module 135 may store the selections in configuration memory 370. For example, the customer may select to receive an alert for every generated video recording, may select to receive an alert for a particular type of trigger, may select to send an alert if the video recording was made within a particular time period, and/or may select to send an alert based on another criterion.

One or more devices and/or accounts for receiving alerts may be selected (block 640). For example, the customer may use remote control 126 to enter information identifying a device and/or an account, video monitoring module 510 may provide the information to home monitoring module 135, and home monitoring module 135 may store the information in configuration memory 370. For example, the customer may select to receive alerts to mobile device 160 associated with the customer. As another example, the customer may select to receive alerts to an email account associated with the customer.

One or more ranking criteria for video recordings may be selected (block 650). For example, the customer may use remote control 126 to select one or more ranking criteria options provided by video monitoring module 510, video monitoring module 510 may provide the selections to home monitoring module 135, and home monitoring module 135 may store the selections in configuration memory 370. For example, the customer may select to rank video recordings in chronological order, may select to rank video recordings by giving preference to video recordings made during a particular time of day, may select to rank video recordings by giving preference to video recordings made with a particular video camera, and/or may select another criterion for ranking video recordings.

One or more annotations criteria for video recordings may be selected (block 660). For example, the customer may use remote control 126 to select one or more annotations criteria options provided by video monitoring module 510, video monitoring module 510 may provide the selections to home monitoring module 135, and home monitoring module 135 may store the selections in configuration memory 370. For example, the customer may select to annotate a video recording with a time at which the video recording was made, may select to annotate a video recording with information identifying a particular video camera that made a video recording, may select to annotate a video recording with information identifying a type of trigger that triggered the video recording, may select to annotate a video recording with a possible explanation based on information stored in annotation memory 365, and/or may select to annotate a video recording based on information obtained from a calendar associated with the customer.

Figure 7:
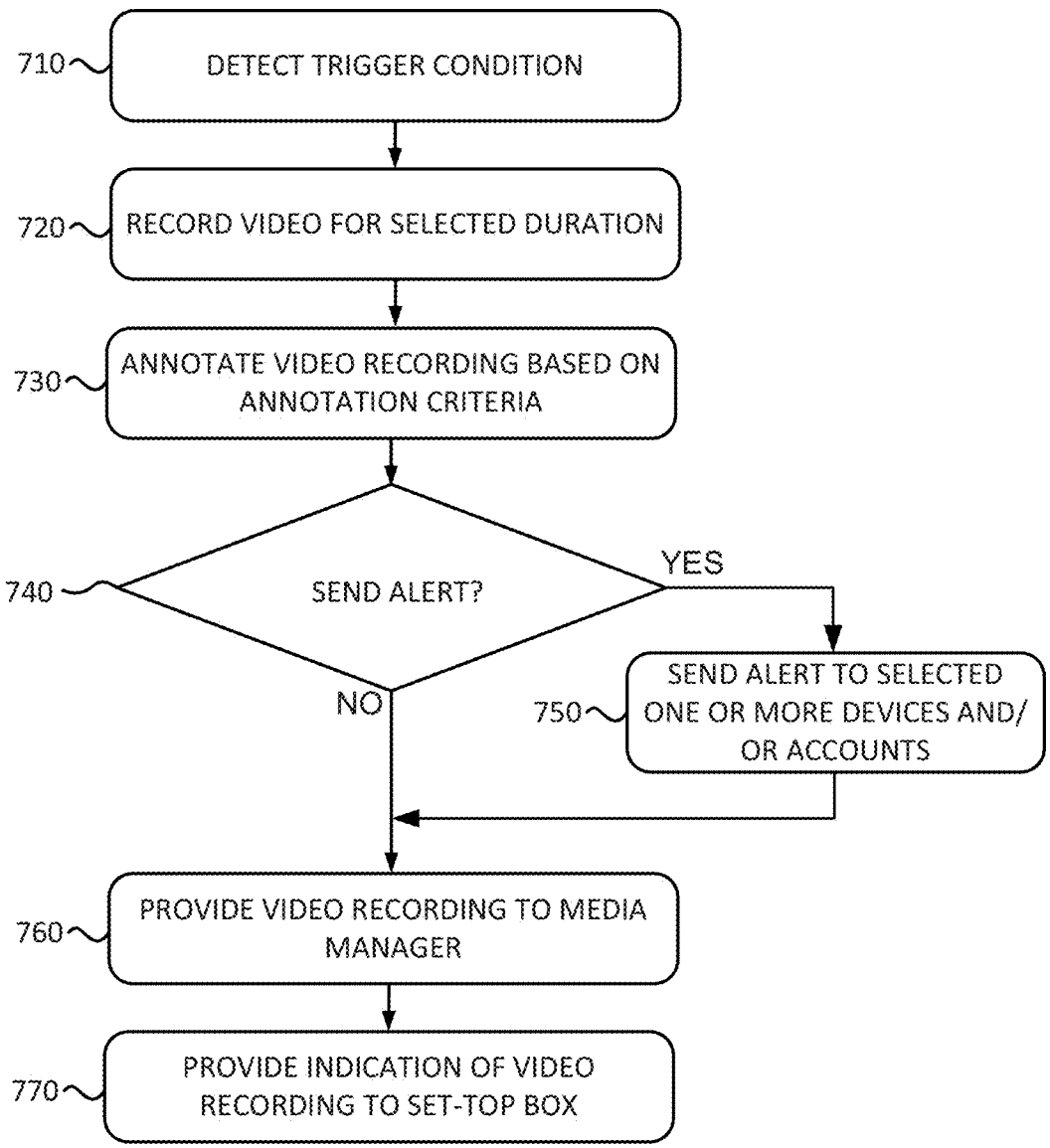
FIG. 7 is a flow chart of an exemplary process for sending an alert about a video recording according to an implementation described herein.

FIG. 7 is a flow chart of an exemplary process for sending an alert about a video recording according to an implementation described herein. In one implementation, the process of FIG. 7 may be performed by home monitoring module 135. In other implementations, some or all of the process of FIG. 7 may be performed by another device or a group of devices separate from home monitoring module 135 and/or including home monitoring module 135. For example, in another implementation, some or all of the process of FIG. 7 may be performed by STB 124.

The process of FIG. 7 may include detecting a trigger condition (block 710). For example, video monitoring device 141 may detect a trigger condition corresponding to a trigger condition specified in trigger criteria field 410 of configuration memory 370. For example, video monitoring device 141 may detect motion within a field of view of video monitoring device 141. A video may be recorded for a selected duration (block 720). For example, in response to detecting the trigger condition, video monitoring device 141 may record a video recording for a duration specified in duration field 420 of configuration memory 370.

The video recording may be annotated based on annotation criteria (block 730). For example, home monitoring module 135 may receive the video recording from video monitoring device 141 and annotation module 360 may annotate the video recording based on annotations criteria stored in annotations criteria field 460 of configuration memory 370. For example, annotation module 360 may annotate the video recording with a time at which the video recording was made, with information identifying a particular video monitoring device 141 that made the video recording, and/or with information identifying a trigger that triggered the video recording to be made.

Additionally, annotation module 360 may determine whether the video recording corresponds to an expected event. For example, annotation module 360 may determine whether any information stored in annotation memory 365 is applicable to the video recording. For example, annotation module 360 may determine that the video recording was made on a weekday between the hours of 2:30 and 4:30 PM by a front door camera and may annotate the video recording with a note indicating that the video recording may correspond to the mailman delivering mail. As another example, annotation module 360 may determine that video stills of the video recording vary by less than a particular amount, indicating a moving object smaller than a person. In response, annotation module 360 may annotate the video recording with a note indicating that that video recording may correspond to an animal moving across the camera's field of view.

Furthermore, annotation module 360 may interface with a calendar, such as a calendar stored on mobile device 160 associated with the customer. Annotation module 360 may determine whether a scheduled event on the calendar corresponds to a time at which the video recording was made and may annotate the video recording with information associated with the scheduled event when a scheduled event on the calendar corresponds to the time at which the video recording was made. For example, the calendar may include an event at 2:00 PM with specified location corresponding to customer premises 120 and with a description "gutter cleaning scheduled." If the video recording was made within a particular time of 2:00 PM, annotation module 360 may annotate the video recording with an indication that the video recording corresponds to a scheduled event and may annotate the video recording with the description from the calendar.

A determination may be made as to whether to send an alert (block 740). For example, alert module 340 may determine whether the video recording satisfies alerts criteria stored in alerts criteria field 430 of configuration memory 370. If it is determined that an alert is to be sent (block 740—YES), an alert may be sent to one or more devices and/or accounts (block 750). For example, alert module 340 may determine that an alert is to be sent for every generated video recording, may determine, by accessing alerts devices field 440, that an alert is to be sent to mobile device 160, and may send an alert to mobile device 160. As another example, the alert may be sent to a particular account specified in alerts devices field 440, such as an email account.

In one implementation, the alert may include the video recording and mobile device 160 may store the video recording. In another implementation, the video recording may be provided to media manager system 170 and the alert may include information about the video recording. If a user of mobile device 160 requests to play the video recording, mobile device 160 may retrieve the video recording from media manager system 170.

If it is determined that an alert is not to be sent (block 740—NO), the video recording may be provided to a media manager (block 760). For example, media manager interface module 350 may provide the video recording to media manager system 170 and media manager system 170 may store the video recording in connection with the customer's account. An indication of the video recording may be provided to a set-top box (block 770). For example, video monitoring module 330 may send an indication about the generated video recording to STB 124 and video monitoring module 510 may store the indication in video recordings memory 540. The indication may include information about the video recording, such as a thumbnail of a still image from the video recording and/or annotations generated for the video recording.

Figure 8:
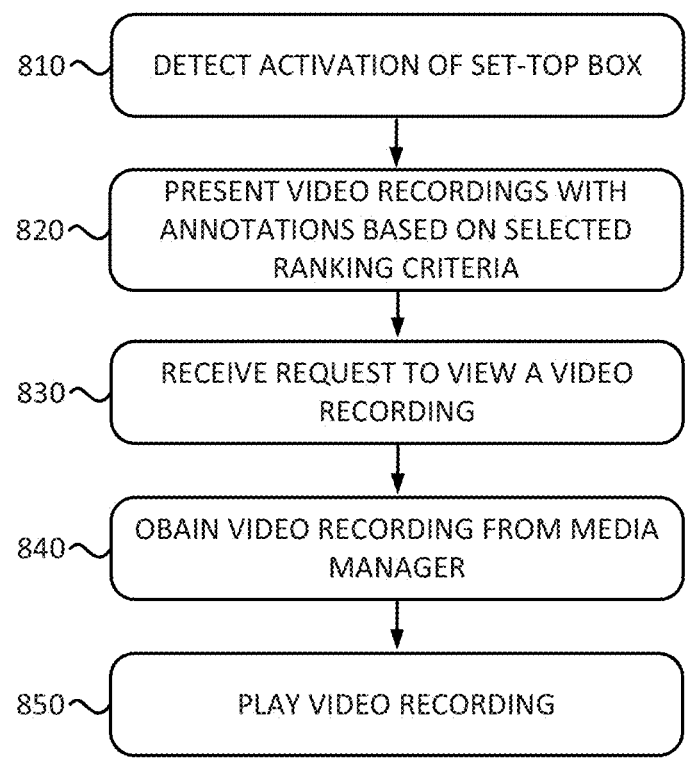
FIG. 8 is a flow chart of an exemplary process for presenting a video recording on a set-top box according to an implementation described herein.

FIG. 8 is a flow chart of an exemplary process for presenting a video recording on a set-top box according to an implementation described herein. In one implementation, the process of FIG. 8 may be performed by STB 124. In other implementations, some or all of the process of FIG. 8 may be performed by another device or a group of devices separate from home monitoring module 135 and/or including STB 124.

The process of FIG. 8 may include detecting activation of a set-top box (block 810). For example, the customer may turn on television 125 using remote control 126. One or more indications of video recordings may be provided based on ranking criteria (block 820). Video monitoring module 510 of STB 124 may detect activation of television 125 and may, in response, determine whether any new video recordings have been made since a last time that television 125 has been turned on, by checking video recordings memory 540. Video monitoring module 510 may present information about new video recordings on television 125. The customer may be given an option to dismiss or postpone viewing the new video recordings and may be given an option to view any of the new video recordings.

A request to view a video recording may be received (block 830). For example, the customer may use remote control 126 to select a new video recording to play. The video recording may be obtained from a media manager (block 840). For example, in response to receiving the selection of a video recording, media manager interface 520 may obtain the selected video recording from media manager system 170. The video recording may be played (block 850). For example, video monitoring module 510 may play the obtained video recording on television 125. In one example, the video recording may be presented via a progressive download. In another example, the video recording may be streamed from media manager system 170.

Figure 9:
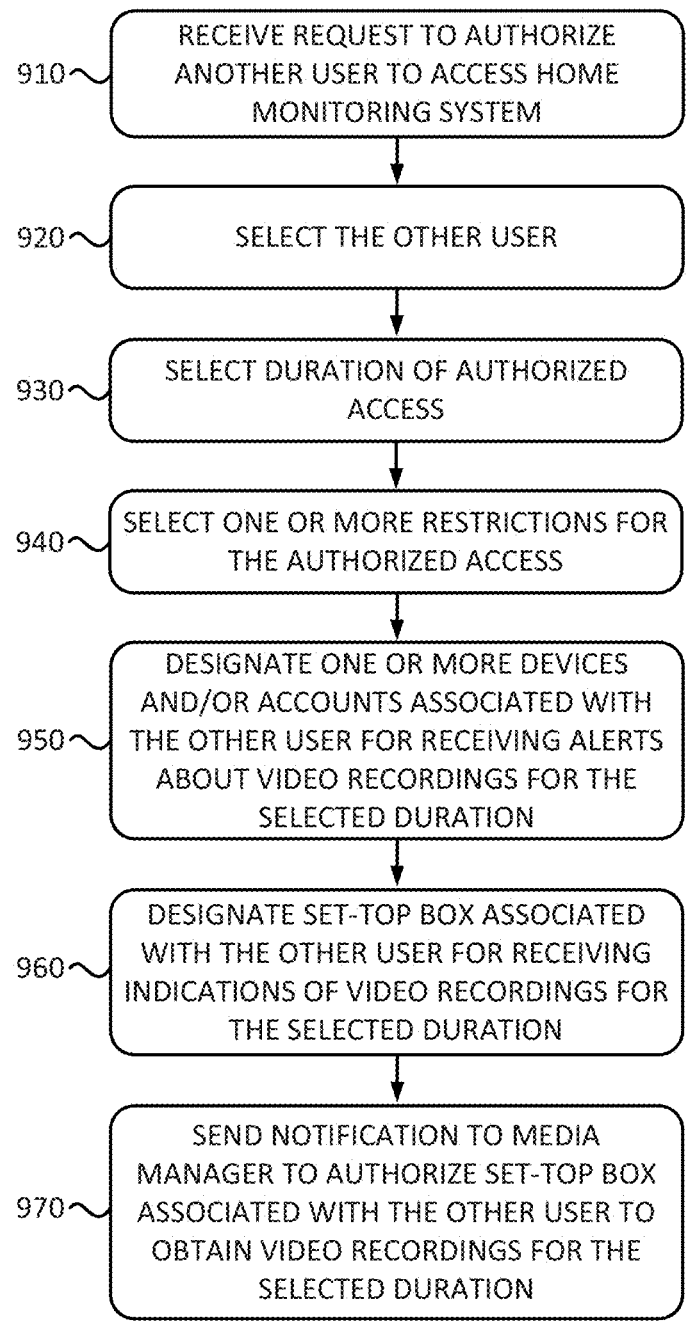
FIG. 9 is a flow chart of an exemplary process for authorizing another user to access a home monitoring system according to an implementation described herein.

FIG. 9 is a flow chart of an exemplary process for authorizing another user to access a home monitoring system according to an implementation described herein. In one implementation, the process of FIG. 9 may be performed by home monitoring module 135. In other implementations, some or all of the process of FIG. 9 may be performed by another device or a group of devices separate from home monitoring module 135 and/or including home monitoring module 135. For example, in another implementation, some or all of the process of FIG. 9 may be performed by STB 124.

The process of FIG. 9 may include receiving a request to authorize another user to access a home monitoring system (block 910). For example, a customer may activate authorization module 310 via video monitoring module 510 of STB 124 and may select to authorize another user to access home monitoring system 130.

Another user may be selected (block 920). For example, the customer may enter information identifying another user. In one implementation, the customer may select the other user from a list of contacts associated with the customer. For example, the customer may have an email account associated with STB 124. In another implementation, the customer may user remote control 126 to enter information identifying the customer (e.g., by selecting keys from a keyboard displayed by the television). The customer may enter the other user's name, telephone number, email address, set-top box identifier, and/or any other information that may be used to identify the other user.

A duration of the authorized access may be selected (block 930). For example, the customer may select a range of dates during which the other user is authorized to access home monitoring system 130 (e.g., dates during which the customer is traveling away from customer premises 120). One or more restrictions for the authorized access may be selected (block 940). For example, the customer may select whether the other user is authorized to monitor and/or control particular home monitoring devices 140. Thus, the customer may select to authorize the other user to either monitor, control, or both monitor and control one or more of video monitoring device 141, light control device 142, lock control device 143, security sensor 144, thermostat 145, and/or energy meter 146. As an example, the customer may authorize the other user to monitor video recordings generated by video monitoring device 141 and may not authorize the other user to control thermostat device 145.

One or more devices and/or accounts associated with the other user may be designated for receiving alerts about video recordings for the selected duration (block 950). For example, once the other user is authorized to access home monitoring system 130, the other user may select a device and/or account for receiving alerts about generated video recordings. Authorization module 310 may store the information about the selected device and/or account in authorization memory 320. If a new video recording is generated by video monitoring device 141 during the authorization period, alert module 340 may send an alert to the selected device and/or account.

A set-top box associated with the other user may be designated for receiving indications of video recordings for the selected duration (block 960). For example, once the other user is authorized to access home monitoring system 130, a set-top box associated with the other user may be identified. Authorization module 310 may store the information about the identified set-top box in authorization memory 320. If a new video recording is generated by video monitoring device 141 during the authorization period, video monitoring module 330 may send information about the new video recording to the set-top box associated with the other user.

A notification may be sent to a media manager to authorize the set-top box associated with the other user to obtain video recordings for the selected duration (block 970). For example, authorization module 310 may send a notification to media manager system 170 to authorize the other set-top box, associated with the other user, to obtain video recordings associated with home monitoring system 130 associated with the customer. Thus, when the other user activates STB 124, associated with the other user, the other user may be able to obtain video recordings associated with the customer.

Figure 10:
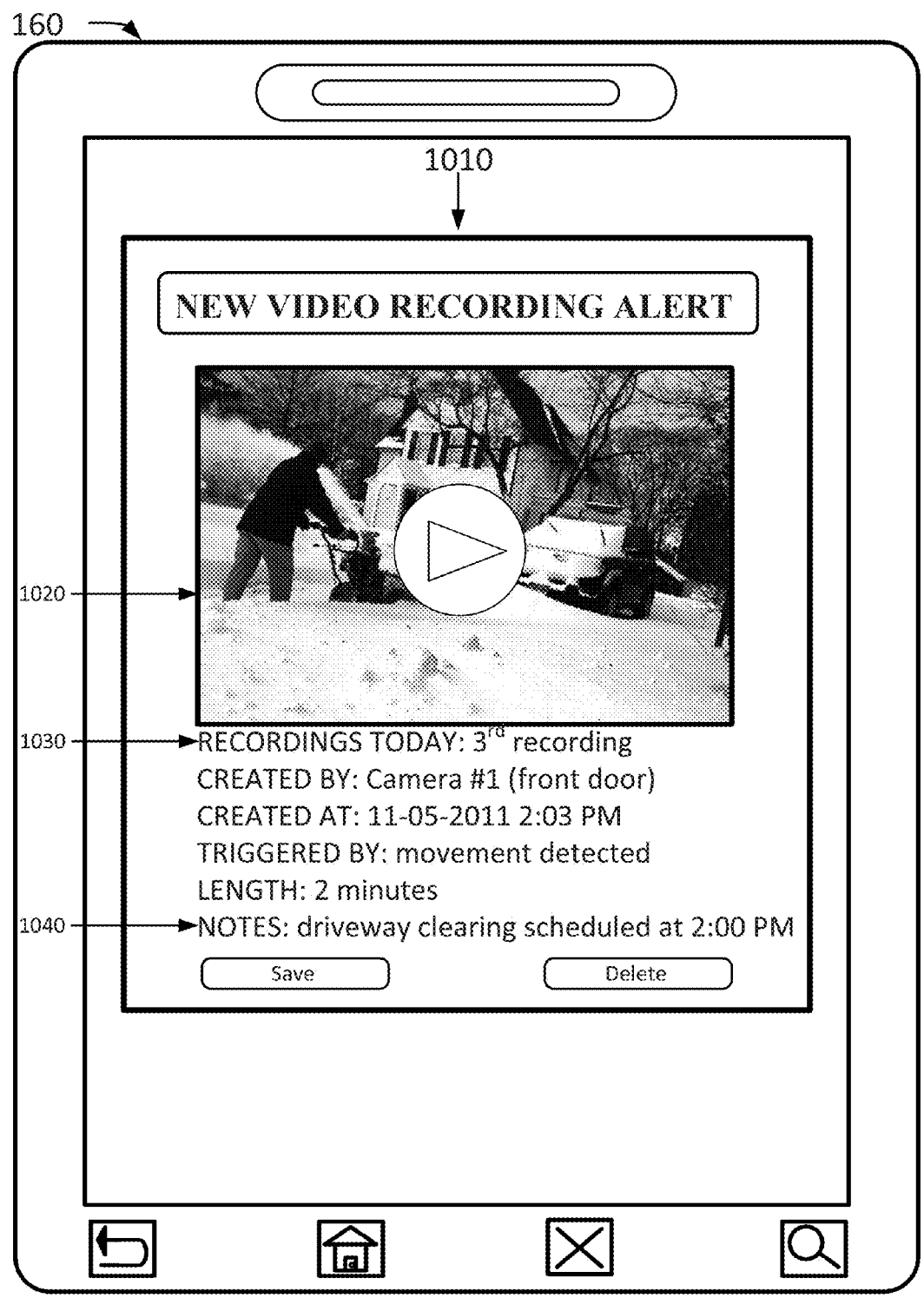
FIG. 10 is a diagram of an exemplary user interface that alerts a user about a video recording according to an implementation described herein.

FIG. 10 is a diagram of an exemplary user interface 1010 that alerts a user about a video recording according to an implementation described herein. As shown in FIG. 10, user interface 1010 may be displayed on mobile device 160 when an alert is received from home monitoring system 130. In one example, mobile device 160 may include a downloaded application for receiving alerts from home monitoring system 130. In another example, the alert may be received by another application installed on mobile device 160, such as, for example, an email application, an instant messaging application, and/or an application for performing maintenance or updates on mobile device 160.

User interface 1010 may include a thumbnail 1020 of the video recording. The user may select the thumbnail and mobile device 160 may play the recording in response to the selection. In one implementation, the alert may include the video recording. In another implementation, the alert may not include the video recording and mobile device 160 may retrieve the video recording from media manager system 70 in response to the selection.

User interface 1010 may further include annotations 1030 associated with the video recording. Annotations 1030 may include information about the video recording, such as a time when the video recording was made, information identifying a camera that made the recording, information identifying what triggered the recording to be made, and/or a duration of the video recording. Annotations 1030 may also include note 1040, which may provide a possible explanation for the video recording. For example, note 1040 may include information obtained from a calendar associated with the customer. In the example of FIG. 10, note 1040 may inform the customer that a driveway clearing was scheduled at 2:00 PM and that the video recording may correspond to the driveway being cleared.

Figure 11:
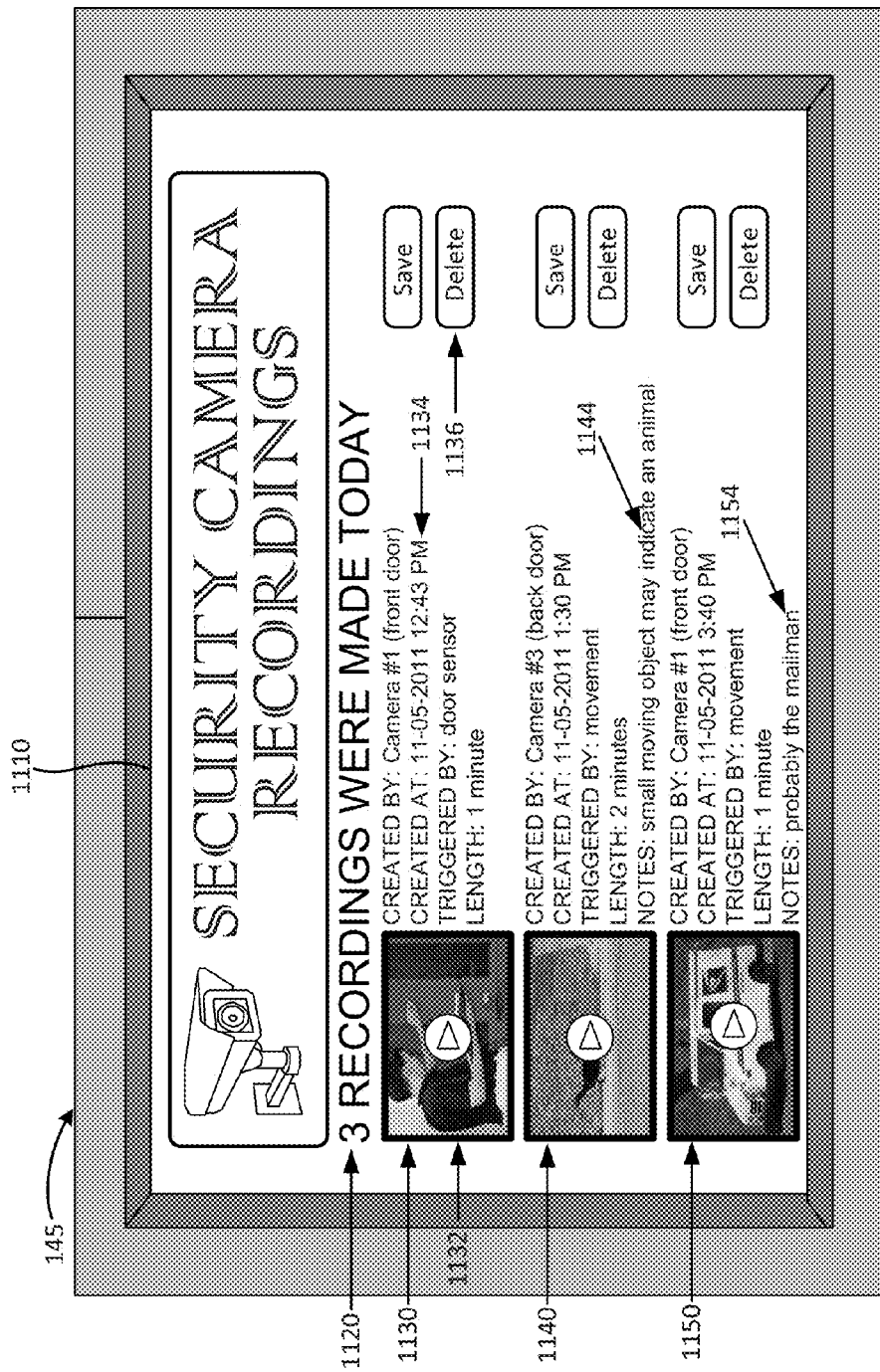
FIG. 11 is a diagram of an exemplary user interface for informing a user about video recordings according to an implementation described herein.

FIG. 11 is a diagram of an exemplary user interface for 1110 informing a user about video recordings according to an implementation described herein. User interface 1110 may be presented to the customer when the customer activates STB 124. As shown in FIG. 11, user interface 1110 may include an indication 1120 of how many new video recordings have been made since the customer last activated STB 124. User interface 1110 may include information about one or more new video recordings, such as first video recording 1130, second video recording 1140, and third video recording 1150.

For example, first video recording 1130 may have been made by a front door camera when a solicitor came to the door. First video recording 1130 may include a thumbnail 1132 of the video recording. The customer may select thumbnail 1132 and STB 124 may retrieve first video recording 1130 from media manager system 170 in response to the selection. Furthermore, first video recording 1130 may include first annotation 1134 that may include information about first video recording 1130 and selection objects 1136 that the customer may select to either save or delete the video recording.

Second video recording 1140 may have been made by a back door camera when a cat walked across the back yard. Second video recording 1140 may include note 1144 which may include the result of an analysis performed by annotation module 360. Annotation module 360 may have determined that video stills of the video recording indicate a moving object smaller than a person and may have annotate the video recording with a note indicating that that video recording may correspond to an animal moving across the camera's field of view, based on information stored in annotation memory 365.

Third video recording 1150 may have been made by a front door camera when the mailman delivered the mail. Third video recording 1150 may include a note 1154, which may include the result of an analysis performed by annotation module 360. Annotation module 360 may have determined, because the video recording was made between the hours of 2:30 PM and 4:00 PM (or another specified range of times) on a weekday, and based on information stored in annotation memory 365, that the video recording may correspond to a mailman delivering the mail.

First video recording 1130, second video recording 1140, and third video recording 1150 may have been ranked based on determined importance. For example, third video recording 1150 may have been ranked third because third video recording 1150 may correspond to an expected event. Second video recording 1140 may have been ranked second, because second video recording 1140 may correspond to an unexpected event, but may correspond to an event involving an animal, which may be determined to be less important than an event involving a person. First video recording 1130 may have been ranked first, because first video recording 1130 may correspond to an unexpected event that involves a person. First video recording 1130, second video recording 1140, and third video recording 1150 may be positioned in user interface 1110 based on the determined rankings.

Figure 12:
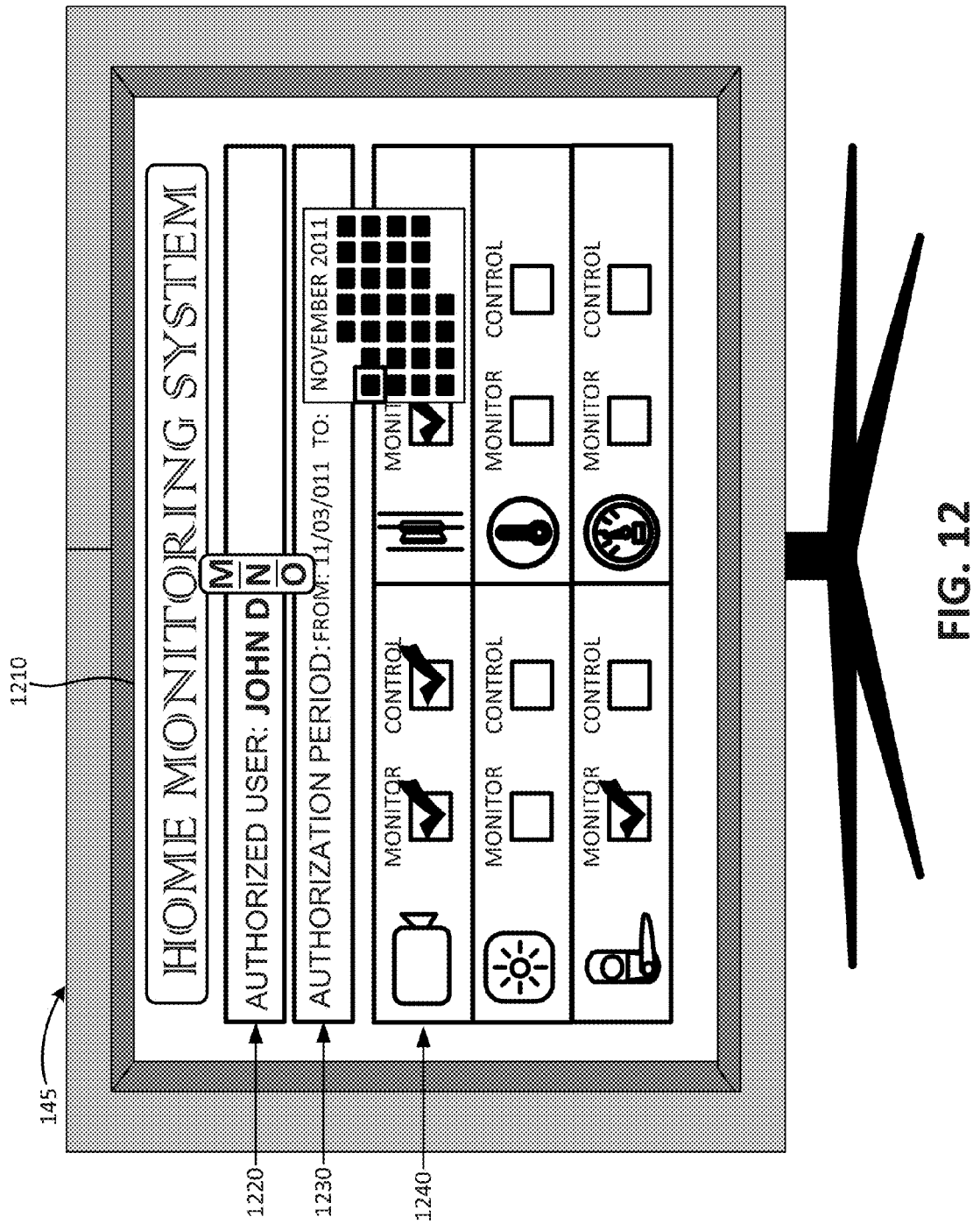
FIG. 12 is a diagram of an exemplary user interface for authorizing another user to access a home monitoring system according to an implementation described herein.

FIG. 12 is a diagram of an exemplary user interface 1210 for authorizing another user to access a home monitoring system according to an implementation described herein. User interface 1210 may include a user field 1220, an authorization period field 1230, and an authorization restrictions field 1240. User field 1220 may enable the customer to specify another user to be authorized to access home monitoring system 130. Authorization period field 1230 may enable the customer to specify an authorization period during which the other user is authorized to access home monitoring system 130. Authorization restrictions field 1240 may enable the customer to specify one or more restrictions for the other user. The customer may use remote control 126 to interact with user field 1220, authorization period field 1230, and/or authorization restrictions field 1240.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-9, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a computer device, the method comprising:
    obtaining, by the computer device, a video recording made by a security camera located on customer premises associated with a user;
    providing, by the computer device, the video recording to a media manager device across a network;
    providing, by the computer device, information about the video recording to a first set-top box associated with the customer premises;
    determining, by the computer device, whether to send an alert about the video recording;
    sending, by the computer device, the alert about the video recording to a device associated with the user, when the alert about the video recording is to be sent;
    authorizing, by the computer device, another user to access the computer device;
    configuring the computer device to send the alert to a device associated with the other user;
    configuring the computer device to send information about the video recording to a second set-top box associated with the other user; and
    sending, by the computer device, a notification to a device that stores the video recording to authorize the second set-top box, associated with the other user, to obtain the video recording.

2. The method of claim 1, further comprising:
    receiving a selection of a trigger condition from the first set-top box; and
    configuring the security camera to generate the video recording in response to the trigger condition.

3. The method of claim 2, wherein the trigger condition includes at least one of:
    a detected motion;
    a particular time;
    an event scheduled in a calendar associated with the user; or
    activation of a security sensor.

4. The method of claim 1, further comprising:
    receiving a selection of a duration length from the first set-top box; and
    configuring the security camera to generate the video recording of the selected duration length.

5. The method of claim 1, further comprising:
    receiving, from the user, a selection of the device associated with the user; and
    configuring the computer device to send the alert about the obtained video recording to the device associated with the user.

6. The method of claim 1, further comprising:
    receiving a selection of an alert criterion from the first set-top box; and
    wherein determining whether to send the alert is based on whether the alert criterion is met.

7. The method of claim 6, wherein the alert criterion includes at least one of a particular time period or a particular trigger condition.

8. The method of claim 1, further comprising:
    annotating the video recording to include information associated with the video recording.

9. The method of claim 8, wherein annotating the video recording includes at least one of:
    annotating the video recording with information about whether the video recording corresponds to an expected event.

10. The method of claim 1, further comprising:
    receiving, from the user, one or more restrictions associated with the authorizing the other user to access the computer device, wherein the one or more restrictions specify whether the other user is authorized to monitor or control one or more of the security camera, a light controller, a lock controller, a security sensor, a thermostat, or an energy meter.

11. A system comprising:
    a first set-top box configured to:
        receive a television signal; and
        provide the television signal to a media playing device;
    a home monitoring device configured to:
        obtain a video recording using a security camera;
        provide the video recording to a media manager device across a network; and
        provide information about the video recording to the first set-top box; and
    wherein the first set-top box is further configured to:
        provide the information about the video recording upon activation of the first set-top box by a user;
        receive a request to view the video recording from the user;
        retrieve the video recording from the media manager device;
        provide the video recording to the media playing device;
        authorize another user to access the home monitoring device;
        send an alert about the video recording to a device associated with the other user;
        send information about the video recording to a second set-top box associated with the other user; and
        send a notification to the media manager device to authorize the second set-top box, associated with the other user, to obtain the video recording.

12. The system of claim 11, wherein the home monitoring device is further configured to:
    send an alert about the video recording to a device associated with the user.

13. The system of claim 11, wherein the home monitoring device is further configured to:
    configure the security camera to generate the video recording in response to a trigger condition;
    configure the security camera to generate the video recording for a particular duration length;
    select one or more criteria for sending the alert about the video recording;
    select one or more devices or accounts associated with the user to receive the alert about the video recording;

select one or more ranking criteria for determining an order in which video recordings are to be presented to the user; or select one or more annotation criteria for annotation the video recording.

14. The system of claim 13, wherein the trigger condition includes at least one of:

a detected motion;

a particular time;

an event scheduled in a calendar associated with the user; or activation of a security sensor.

15. The system of claim 11, wherein the home monitoring device is further configured to:

annotate the video recording with information about whether the video recording corresponds to an expected event.

16. The system of claim 11, wherein the home monitoring device is further configured to:

annotate the video recording based on a scheduled event in a calendar associated with the user.

17. The system of claim 11, wherein the home monitoring device is further configured to:

control at least one of a light control device, a lock control device, a security sensor, a thermostat, or an energy meter; and authorize the other user to control the at least one of a light control device, a lock control device, a security sensor, a thermostat, or an energy meter.

18. A non-transitory computer-readable medium storing instructions executable by one or more processors, the non-transitory computer-readable medium comprising:

one or more instructions to obtain a video recording made by a security camera located on customer premises associated with a user;

one or more instructions to provide the video recording to a media manager device across a network;

one or more instructions to provide information about the video recording to a first set-top box associated with the customer premises;

one or more instructions to determine whether to send an alert about the video recording;

one or more instructions to send the alert about the video recording to a device associated with the user, when the alert about the video recording is to be sent;

one or more instructions to authorize another user to access the first set-top box;

one or more instructions to configure the first set-top box to send the alert to a device associated with the other user;

one or more instructions to configure the first set-top box to send information about the video recording to a second set-top box associated with the other user; and one or more instructions to send a notification to a device that stores the video recording to authorize the second set-top box, associated with the other user, to obtain the video recording.

* * * * *